(12) United States Patent
Chikkali et al.

(10) Patent No.: US 11,155,654 B2
(45) Date of Patent: Oct. 26, 2021

(54) HETEROGENOUS PRECATALYST FOR PREPARATION OF HIGHLY CRYSTALLINE, DISENTANGLED, ULTRA HIGH MOLECULAR WEIGHT POLYETHYLENE (UHMWPE) AND A PROCESS FOR PREPARATION THEREOF

(71) Applicant: COUNCIL OF SCIENTIFIC AND INDUSTRIAL RESEARCH, New Delhi (IN)

(72) Inventors: Samir Hujur Chikkali, Pune (IN); Dipa Mandal, Pune (IN); Ravindra Gote, Pune (IN); Ketan Patel, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 16/650,729

(22) PCT Filed: Oct. 8, 2018

(86) PCT No.: PCT/IN2018/050637
§ 371 (c)(1),
(2) Date: Mar. 25, 2020

(87) PCT Pub. No.: WO2019/069328
PCT Pub. Date: Apr. 11, 2019

(65) Prior Publication Data
US 2020/0277415 A1    Sep. 3, 2020

(30) Foreign Application Priority Data
Oct. 6, 2017   (IN) .............. 201711035497

(51) Int. Cl.
*C08F 110/02*   (2006.01)

(52) U.S. Cl.
CPC ................... *C08F 110/02* (2013.01)

(58) Field of Classification Search
CPC ...... C08F 110/02; C08F 10/02; C08F 4/6555; C08F 2500/01; C08F 2500/03
USPC ......................................... 526/170
See application file for complete search history.

(56) References Cited

U.S. PATENT DOCUMENTS

| | | | |
|---|---|---|---|
| 6,015,768 A | 1/2000 | Ray et al. | |
| 6,730,752 B2 | 5/2004 | Eaton et al. | |
| 7,371,806 B2 * | 5/2008 | Ferraro | C08F 10/00 526/124.2 |
| 9,676,877 B2 * | 6/2017 | Hjertberg | C08F 10/02 |
| 2011/0269925 A1 | 11/2011 | Friederichs | |

OTHER PUBLICATIONS

International Searching Authority, International Search Report and Written Opinion for International Application No. PCT/IN2018/050637, dated Oct. 8, 2018, (8 pages), Indian Patent Office, New Delhi, India.

(Continued)

*Primary Examiner* — William K Cheung
(74) *Attorney, Agent, or Firm* — Alston & Bird LLP

(57) ABSTRACT

The present invention disclosed a novel heterogeneous catalytic system (precatalyst), process for the preparation and use thereof for the synthesis of highly crystalline, disentangled ultra high molecular weight polyethylene (UHMWPE).

20 Claims, 9 Drawing Sheets

(56) References Cited

OTHER PUBLICATIONS

Romano, Dario et al. *Aluminoxane Co-Catalysts for the Activation of a Bis Phenoxyimine Titanium (IV) Catalyst in the Synthesis of Disentangled Ultra-High Molecular Weight Polyethylene*, Polymer, Sep. 15, 2015, vol. 74, pp. 76-85.

Romano, Dario et al. *Effect of a Cocatalyst Modifier in the Synthesis of Ultrahigh Molecular Weight Polyethylene Having Reduced Number of Entanglements*, Journal of Polymer Science Part A: Polymer Chemistry, Jan. 9, 2013, vol. 51, No. 7; pp. 1630-1635. DOI: 10.1002/pola.26534.

\* cited by examiner

HETEROGENOUS PRECATALYST FOR PREPARATION OF HIGHLY CRYSTALLINE, DISENTANGLED, ULTRA HIGH MOLECULAR WEIGHT POLYETHYLENE (UHMWPE) AND A PROCESS FOR PREPARATION THEREOF

CROSS REFERENCE TO RELATED APPLICATIONS

This application is a National Stage Application, filed under 35 U.S.C. § 371, of International Application No. PCT/IN2018/050637, filed Oct. 8, 2018, which international application claims priority to and the benefit of Indian Application No. 201711035497, filed Oct. 6, 2017; the contents of both of which as are hereby incorporated by reference in their entireties.

BACKGROUND

Related Field

The present invention relates to a heterogeneous precatalyst and a process for the preparation thereof. More particularly, present invention relates to a process for synthesis of highly crystalline, disentangled ultra high molecular weight polyethylene (UHMWPE) using the heterogeneous precatalyst.

Description of Related Art

UHMWPE has a molecular weight of at least 1 million g/mol, which is 10 to 100 times greater than the molecular weight of high-density polyethylene (HDPE). UHMWPE offers major advantages in terms of increased impact resistance, tensile strength, abrasion resistance, and stress-crack resistance. UHMWPE can be produced by Ziegler polymerization. The process requires exceptionally pure ethylene and other raw materials. Like conventional HDPE, UHMWPE made by Ziegler polymerization has a broad molecular weight distribution $M_w/M_n$ ($M_w$ is the weight average molecular weight, $M_n$ is the number average molecular weight) of within the range of 5 to 20 and is highly entangled.

However, UHMWPE with a narrow molecular weight distribution $M_w/M_n$ of less than 5 have improved mechanical properties. Newly developed metallocene and single-site catalysts advantageously provide polyethylene and other polyolefins with very narrow molecular weight distribution ($M_w/M_n$ from 1 to 5). The narrow molecular weight distribution results in reduced low molecular weight species and higher $M_n$ which further improves abrasion resistance. These new catalysts also significantly enhance incorporation of long-chain α-olefin comonomers into polyethylene, and therefore reduce its density. However, these catalysts produce polyethylene having a lower molecular weight than that made with Ziegler-Natta catalysts.

U.S. Pat. No. 6,015,768 discloses a process for the preparation of a heterogeneous catalyst useful for preparation of super high molecular weight polymers of alpha-olefins, containing at least four carbon atoms or more. More specifically, the invention relates to a method for preparing such heterogeneous catalyst based on zirconium.

US20110269925A1 discloses a catalyst for the production of polyethylene comprising a solid reaction product obtained by reaction of a) a hydrocarbon solution comprising; 1) an organic oxygen containing magnesium compound and 2) an organic oxygen containing titanium compound and b) a compound comprising a transition metal from Group IV or V of Mendeleev's Periodic System of Chemical Elements and containing at least two halogen atoms.

Article titled "Aluminoxane co-catalysts for the activation of a bis phenoxyimine titanium (IV) catalyst in the synthesis of disentangled ultra-high molecular weight polyethylene" by D Romano et al. published in *Polymer*, 2015, 74, pp 76-85 report new activation systems for the bis[N-(3-tert-butylsalicylidene)pentafluoroanilinato] Ti (IV) dichloride catalyst (FI) for the synthesis of ultra-high molecular weight polyethylene (UHMWPE) with reduced entanglement density. Together with the well-studied FI catalyst-methylaluminoxane (MAO) catalytic system, different aluminoxanes, namely polymethylaluminoxane-improved performance (PMAO), modified methylaluminoxane type 12 (MMAO12) and type 3A (MMAO3A) have been used.

Article titled "Effect of a co-catalyst modifier in the synthesis of ultrahigh molecular weight polyethylene having reduced number of entanglements" by D Romano et al. published in *Journal of Polymer Science Part A Polymer Chemistry;* 2013, 51(7); pp 1630-1635 the use of a hindered phenol to trap free trimethylaluminum (TMA) in methylaluminoxane (MAO) solutions to improve the performance of single-site, homogeneous catalysts for olefin polymerization. In the present study, with the help of rheological analyses, they have investigated and compared the molecular weight, molecular weight distribution and entanglement density of ultrahigh molecular weight polyethylene synthesized with a single-site catalyst activated by MAO and phenol-modified MAO.

U.S. Pat. No. 6,730,752B2 discloses a composition including polyalphaolefins that function as drag reducing agents and a process for the preparation of polyalphaolefins that function as drag reducing agents. The process includes contacting alpha olefin monomers with a catalyst system, which includes a catalyst and an activator (co-catalyst) in a reactant mixture. The catalyst is a transition metal catalyst, preferably titanium trichloride, and the co-catalyst may include an alkylaluminoxane, alone or in combination, with a dialkylaluminum halide or a halohydrocarbon. The polymerization of the alpha olefin monomers produces a non-crystalline, ultra-high molecular weight polyalphaolefin having an inherent viscosity of at least 10 dL/g.

The prior art catalytic systems have several limitations including Multi-step, time consuming ligand synthesis, multi-step catalyst synthesis, high co-catalyst (aluminium) to catalyst ratio, use of metal halides, which can cause reactor corrosion, produce only highly entangled UHMWPE, and use a process where it is difficult to control the polyethylene crystallization.

Therefore, there is need for an efficient method that will overcome prior art drawback. Accordingly, present inventors developed a novel olefin polymerization catalyst used for the synthesis of disentangled UHMWPE with improved physical and mechanical properties.

BRIEF SUMMARY

The main objective of the present invention is to provide a heterogeneous precatalyst.

Another objective of the present invention is to provide a process for the preparation of heterogeneous precatalyst.

Yet another objective of the present invention is to provide a process for the preparation of disentangled ultra high molecular weight polyethylene (dis-UHMWPE) using heterogeneous precatalyst.

Accordingly, present invention provides a heterogeneous precatalyst comprising:
(a) a compound of formula M(OR)$_4$;
(b) a compound of formula AlR'$_n$Cl$_{3-n}$ and;
(c) a support (M'-X)

wherein transition metal (M) is selected from the group consisting of Titanium (Ti), Zirconium (Zr), Hafnium (Hf), Vanadium (V), Niobium (Nb) or Tantalum (Ta) preferably Titanium (Ti) or Zirconium (Zr);

Al=Aluminium;

R is selected from the group consisting of a straight chain or branched alkyl group containing 1 to 8 carbon atoms, such as methyl, ethyl, iso-propyl, tert-butyl, an aryl or substituted aryl group, such as phenyl, p-methylphenyl, p-methoxyphenyl, 2,4,6 bromophenyl and 2,4,6 triethoxy-phenyl group;

R' is selected from the group consisting of a straight chain or branched alkyl group containing 1 to 8 carbon atoms such as methyl, ethyl, isopropyl and tert butyl.

n=1 to 3;

support (M'-X) is selected from the group consisting of magnesium chloride, calcium chloride and barium chloride.

In an embodiment of the present invention, the mole ratio of M'/M is in the range of 10 to 20, preferably 15 to 16.

In another embodiment of the present invention, the mole ratio of Al/M is in the range of 8 to 16 preferably 12 to 13.

In yet another embodiment of the present invention, said catalyst comprises M is in the range of 2.5 to 6 weight %, M' is in the range of 10 to 17 weight % and Al is in the range of 0.8 to 1.1 weight %.

In yet another embodiment, present invention provides a process for the preparation of heterogeneous precatalyst comprising the steps of:

a) reacting compound of general formula M(OR)$_4$ with metal halide in a solvent at temperature in the range of 60° C. to 100° C. for the period in the range of 1 to 4 hrs to form slurry;

b) activating the slurry as obtained in step (a) by treating with compound of formula AlR'$_n$Cl$_{3-n}$ in a solvent at a temperature in the range of 40 to 50° C. under constant stirring followed by further stirring the reaction mixture at temperature in the range of 60 to 100° C. for the period in the range of 2 to 8 hrs to afford heterogeneous precatalyst.

In yet another embodiment of the present invention, said support (M'-X) is selected from the group consisting of magnesium chloride, calcium chloride or barium chloride.

In yet another embodiment of the present invention, compound of formula AlR'$_n$Cl$_{3-n}$ is selected from the group consisting of triethyl aliuminium, trimethyl aluminium, diethyl aluminium chloride, ethyl aluminium chloride, aluminium chloride, tri-isopropyl aliuminium, diisopropyl aluminium chloride, tri-tertbutyl aluminium or di-tertbutyl aluminium chloride.

In yet another embodiment of the present invention, solvent used is hydrocarbons selected from the group consisting of n-pentane, n-hexane, n-heptane, n-octane, toluene or xylene.

In yet another embodiment, present invention provides a process for the synthesis of disentangled ultra-high molecular weight polyethylene using heterogeneous precatalyst comprising the steps of:

i. polymerizing the ethylene monomer in presence of heterogeneous precatalyst as claimed in claim 1 and co-catalyst at temperature in the range of 0 to 60° C. for the period in the range 10 min to 10 hrs to afford disentangled ultra high molecular weight polyethylene.

In still another embodiment of the present invention, said solvent is saturated or unsaturated hydrocarbon, preferably toluene.

In still another embodiment of the present invention, said co-catalyst is selected from the group consisting of methylaluminoxane (MAO), modified methylaluminoxane (MMAO12) or ethylaluminoxane.

In still another embodiment of the present invention, said reaction is carried out under argon atmosphere.

In still another embodiment of the present invention, the mole ratio of co-catalyst to M in the precatalyst is 100 to 1000, preferably 600.

In still another embodiment of the present invention, the molecular weight of UHMWPE is in the range of $1\times10^6$ to $4\times10^7$ grams/mole.

In still another embodiment of the present invention, said reaction is carried out in continuous or batch mode.

DETAILED DESCRIPTION OF VARIOUS EMBODIMENTS

Figure 1:
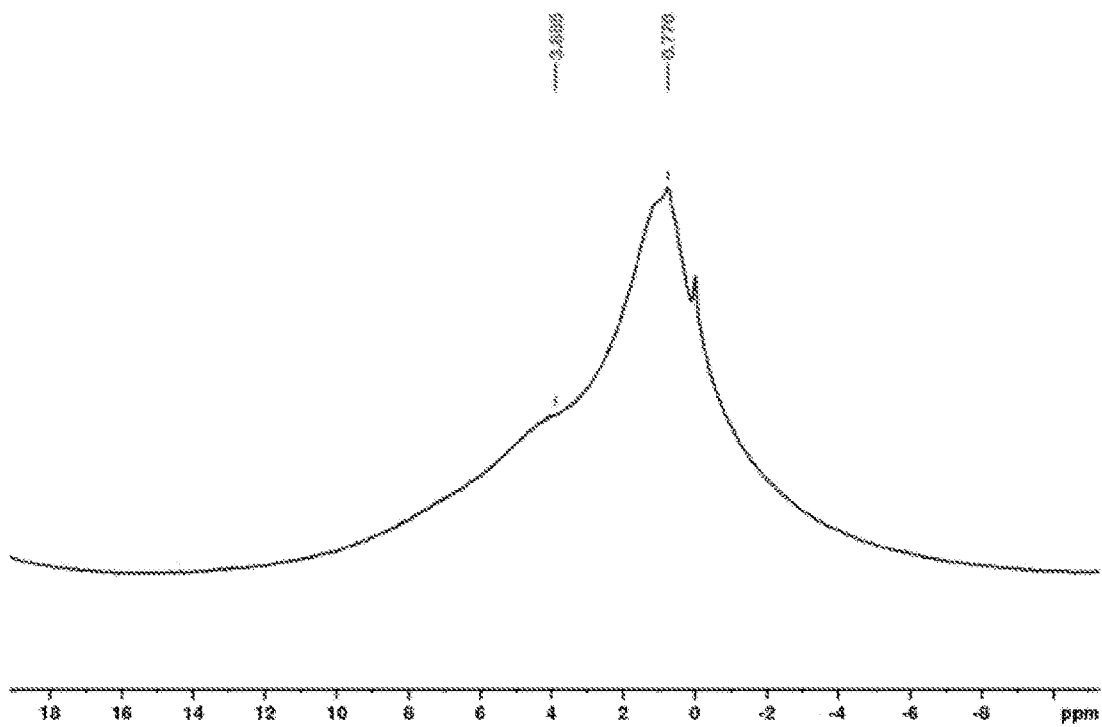
FIG. 1: Solid-state $^1$H NMR spectrum (300 MHz) of the precatalyst 1.
Figure 2:
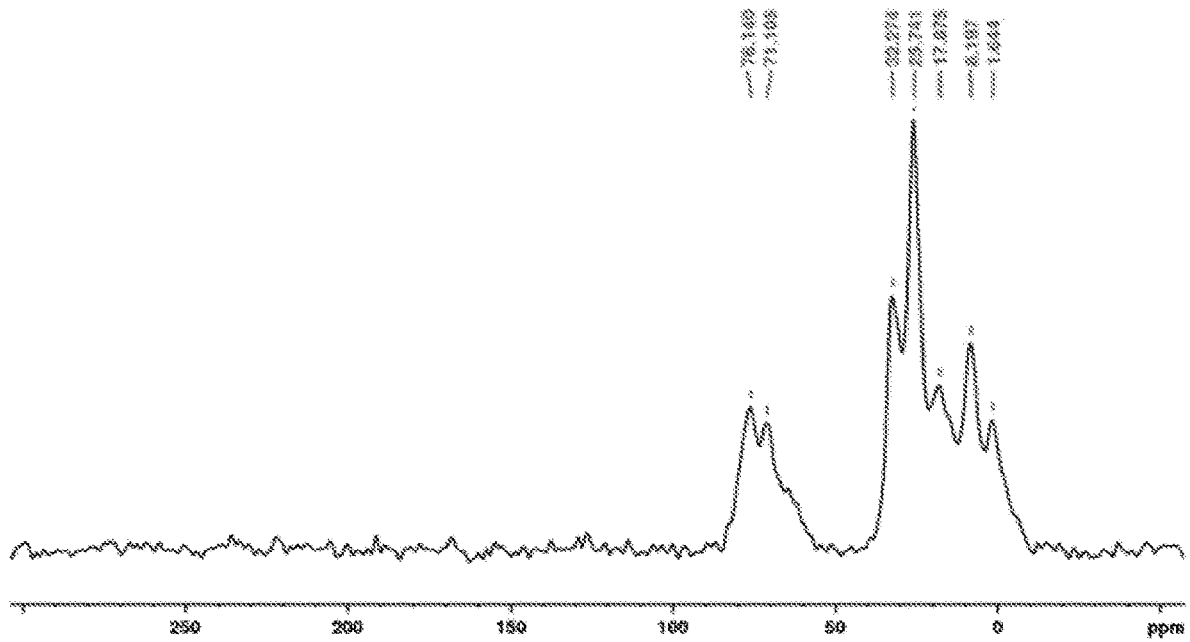
FIG. 2: Solid-state $^{13}$C NMR spectrum (75.5 MHz) of the precatalyst 1.
Figure 3:
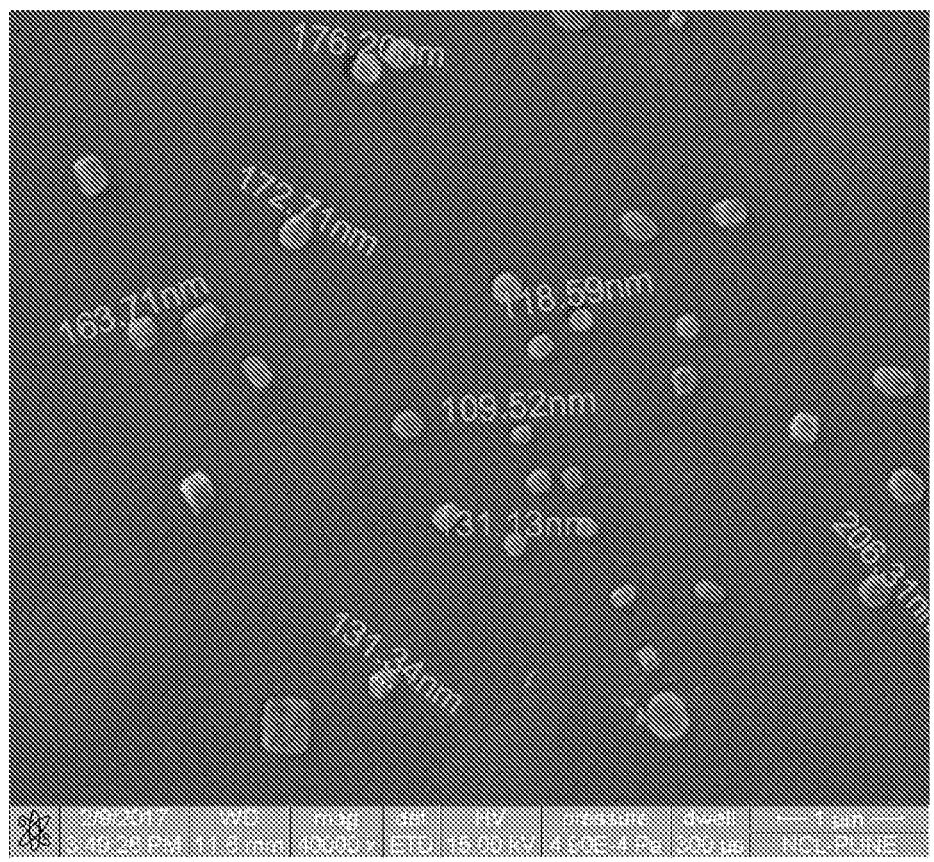
FIG. 3: Scanning Electron Microscopy (SEM) micrographs of the precatalyst.
Figure 4:
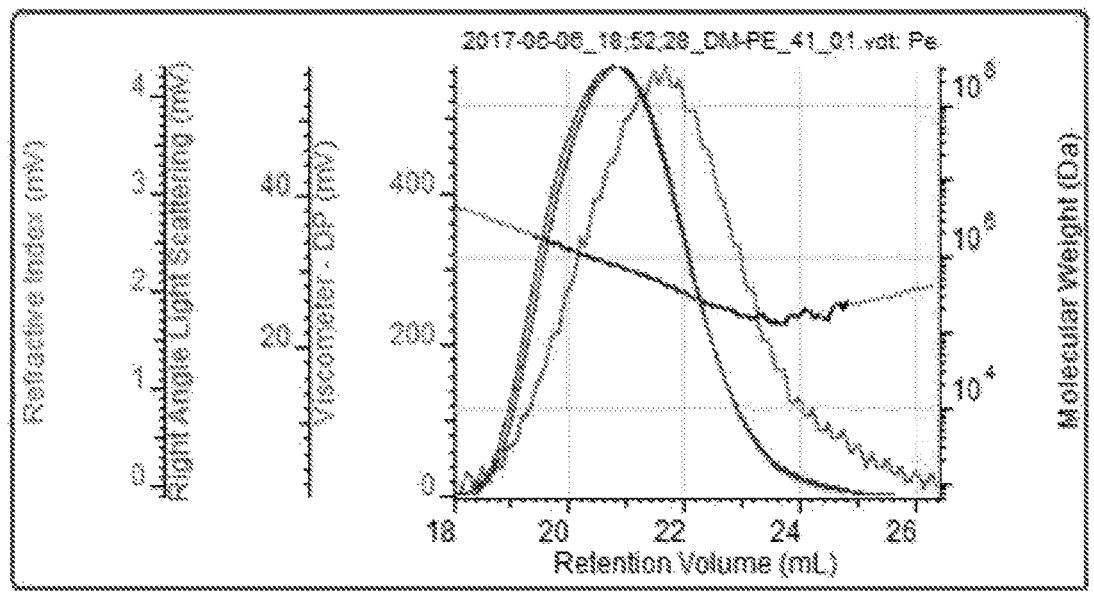
FIG. 4: High temperature gel permeation chromatography (HT-GPC) curve for entry 1.

The terms "heterogeneous catalytic system" or precatalyst or "heterogeneous precatalyst" are used as synonyms throughout the specification and the terms are having the same meaning until and otherwise specified.

The term "precatalyst" as used in the specification is defined as the compound that is converted to a catalyst during the course of the catalyzed reaction.

The present invention provides a heterogeneous catalytic system (precatalyst), process for the preparation and use thereof for the synthesis of highly crystalline, disentangled ultra high molecular weight polyethylene (UHMWPE).

The present invention provides a heterogeneous catalytic system (precatalyst) comprising:
(a) transition metal alkoxide/phenoxide of general formula M(OR)$_4$
(b) organoaluminum compound of general formula AlR'$_n$Cl$_{3-n}$
(c) support.

The M is selected from Titanium (Ti), Zirconium (Zr), Hafnium (Hf), Vanadium (V), Niobium (Nb) or Tantalum (Ta) preferably Titanium (Ti) or Zirconium (Zr).

The R is selected from the group consisting of a straight chain or branched alkyl group containing 1 to 8 carbon atoms, such as methyl, ethyl, iso-propyl, tert-butyl, an aryl or substituted aryl group, such as phenyl, p-methylphenyl, p-methoxyphenyl, 2,4,6 bromophenyl and 2,4,6 triethoxyphenyl group.

The R' is selected from the group consisting of a straight chain or branched alkyl group containing 1 to 8 carbon atoms such as methyl or ethyl.

n is selected from 1 to 3.

The mol ratio of Mg/M is in the range of 10 to 20, preferably 15 to 16. The mol ratio of Al/M is in the range of 8 to 16 preferably 12 to13. The catalyst system comprises 2.5 to 6 weight % M, 10 to 17 weight % Mg and 0.8 to 1.1 weight % Al.

The support is selected from magnesium chloride, calcium chloride or barium chloride.

The present invention provides a process for the preparation of heterogeneous catalytic system (precatalyst) comprising the steps of:
a) reacting metal alkoxide/phenoxide with metal halide in a suitable solvent to form slurry;
b) activating the slurry of step (a) by treating with an organoaluminum halide compound in solvent to afford heterogeneous catalytic system (precatalyst).

The process for the preparation of heterogeneous catalytic system (precatalyst) comprising the steps of:
a) stirring the reaction mixture of metal alkoxide/aryloxide and metal halide in solvent at temperature in the range of 60° C. to 100° C. for the period in the range of 1 to 4 hrs;
b) adding organoaluminum compound in solvent to the reaction mixture of step (a) at a temperature in the range of 40 to 50° C. under constant stirring followed by further stirring the reaction mixture at temperature in the range of 60 to 100° C. for the period in the range of 2 to 8 hrs to afford heterogeneous catalytic system (precatalyst).

The metal alkoxide/aryloxide is selected from zirconium (IV) ethoxide or titanium(IV) ethoxide, zirconium(IV) isopropoxide or titanium(IV) isopropoxide.

The metal halide is selected from magnesium chloride, calcium chloride or barium chloride.

The organoaluminum halide compound is selected from triethyl aluminium, diethyl aluminium chloride, ethyl aluminium chloride, aluminium chloride, tri-isopropyl aluminium, diisopropyl aluminium chloride, tri-tertbutyl aluminium or di-tertbutyl aluminium chloride.

The solvent is selected from hydrocarbons preferably n-hexane n-pentane, n-heptane, n-octane, toluene or xylene.

The present invention provides a process for the synthesis of disentangled ultra high molecular weight polyethylene comprising the steps of:

i. polymerizing the ethylene monomer in presence of heterogeneous precatalyst and co-catalyst at temperature in the range of 0 to 60° C. for the period in the range 10 min to 10 hrs to afford disentangled ultra high molecular weight polyethylene.

The solvent is selected from a saturated or unsaturated hydrocarbon preferably toluene.

The co-catalyst is selected from boron based or aluminum based co-catalysts, preferably methylaluminoxane, ethylaluminoxane or modified methylaluminoxane (MMAO12). More preferably, the co-catalyst is modified methylaluminoxane (MMAO12).

The reaction is carried out under argon atmosphere.

The reaction is carried out in continuous or batch mode.

The mole ratio of co-catalyst/M is 100 to 1000, preferably 600, where M=Ti or Zr and The molecular weight of UHMWPE is in the range of $1 \times 10^6$ to $4 \times 10^7$.

The solid state $^1$H and $^{13}$C NMR spectra of the catalysts 1 and 2 are recorded. In $^1$H NMR, the methyl peaks originating from the ethyl group present in the catalyst are observed at 0.86 and 0.99 ppm for catalyst 2 and 1 respectively. The methylene peaks originating from the ethyl group are observed at 4.08 and 4.38 ppm in catalyst 2 and 1 respectively. In $^{13}$C NMR, the peaks at 18.4 and 17.5 ppm indicates the methyl (CH$_3$) peaks in catalyst 2 and 1 respectively. In addition the methylene (CH$_2$) signals appear as a doublet at 71.5 and 77.7 ppm for catalyst 2 and 62.5 and 66.4 ppm (for catalyst 1). The Peaks at 26.0 and 33.0 ppm (for catalyst 2); 25.6 and 32.9 ppm (for catalyst 1) in the $^{13}$C NMR indicate the methylene peaks correspond to the residual n-hexane, which is used as solvent.

The solid state (CP-MAS: Cross-Polarization Magic Angle Spinning) proton NMR spectrum of this solid revealed a resonances at 0.77 and 3.88 ppm. These peaks could be assigned to the methyl (CH$_3$) and methylene (CH$_2$) groups present on the titanium, respectively. The proton NMR finding is further supported by $^{13}$C CP-MAS NMR which displayed peaks at 17.8 and 71.1-76.1 ppm which can be assigned to methyl and methylene carbons respectively. The metal content of the catalyst (1) is determined by inductively coupled plasma-optical emission spectroscopy, which revealed 3.02% Ti, 17.83% Mg and 1.12% Al in the catalyst.

Figure 5:
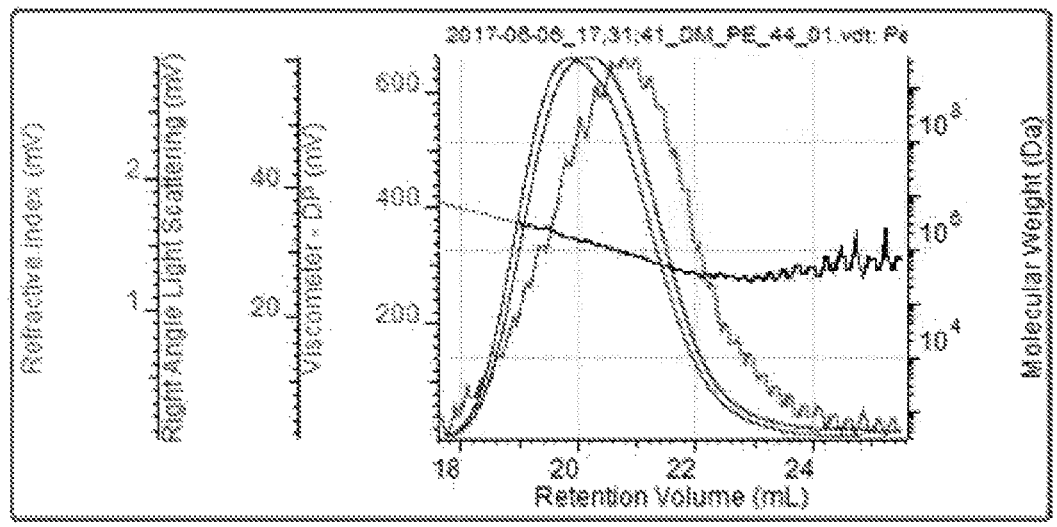
FIG. 5: HT-GPC curve for entry 2.
Figure 6:
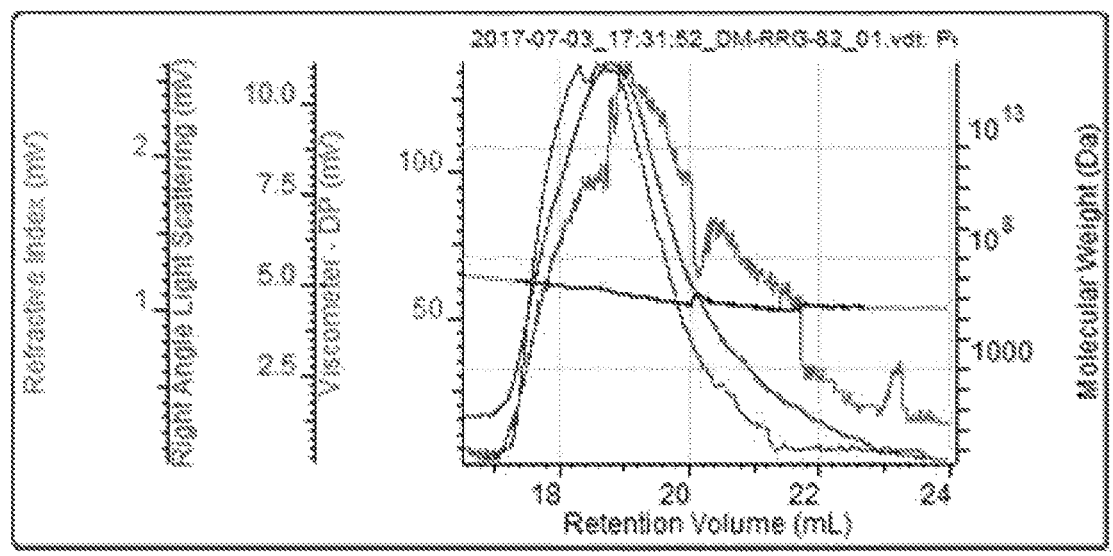
FIG. 6: HT-GPC curve for entry 3.
Figure 7:
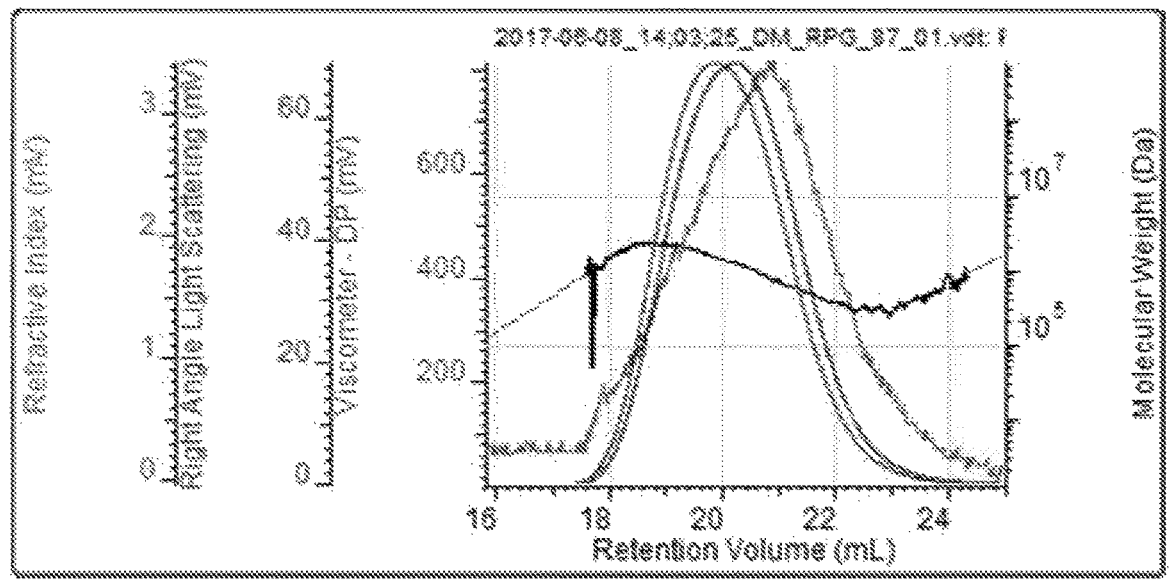
FIG. 7: HT-GPC curve for entry 4.

The morphological characteristics of catalyst 1 are obtained using scanning electron microscopic (SEM) analysis. The SEM images of catalyst 1 and 2 are shown in FIG. 5. In both the catalyst, the particles are almost spherical/oval in shape in a size range of 129-154 nm and 66-166 nm in diameter for catalyst 2 and 1 respectively. These clearly indicate that both the catalysts contain particles of different sizes. The SEM image clearly shows that the particles of catalyst 1 are spherical or oval in shape with an average size of 109-206 nm.

Figure 13:
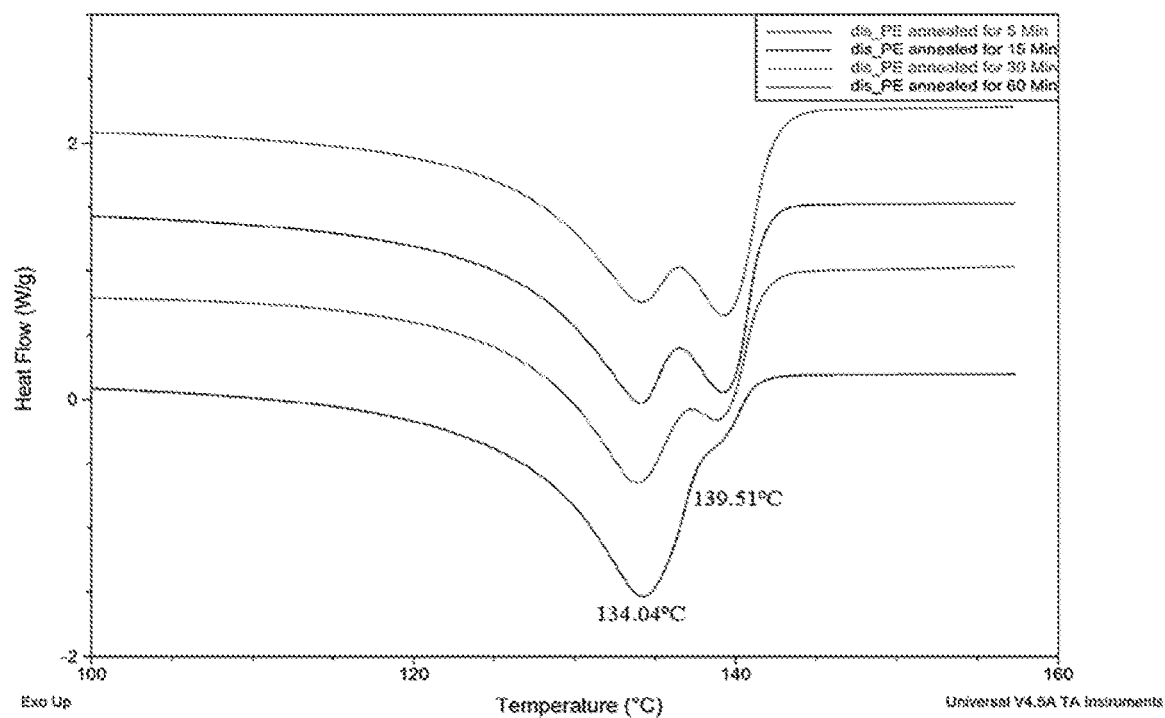
FIG. 13: DSC plots of the dis-UHMWPE sample (table 1, run 13) obtained from the second heating cycle with annealing time of 5, 15, 30 and 60 minutes.

The Ti 2p XPS spectra collected from catalyst 1 before and after the addition of MMAO12 are shown in FIG. 13. Two distinct peaks corresponding to the spin orbit split of 2p centred around 458 eV and 464 eV are discernible from the Ti2p core-level spectrum. The XPS of the Ti 2p$_{3/2}$ peak for the Ti(OEt)$_4$/MgCl$_2$ system activated with diethyl aluminium chloride, is deconvoluted with titanium species in 4+, 3+ and 2+ oxidation states. The binding energy values are in line with the reported values. Quantification of different Ti oxidation states shows the following composition; 25.7% of Ti(IV) [BE=459.7 eV], 56.8% of Ti(III) [BE=457.2 eV] and 17.5% of Ti(II) [BE=454.4 eV]. The reason for the presence of multiple oxidation states of surface Ti species could be because of the reduction of Ti$^{4+}$

[Ti(OEt)$_4$] in presence of organoaluminum in an uncontrolled manner resulting in a multi-site catalyst towards olefin polymerization. The activation with MMAO12, for [Al]/[Ti] ratio=20, revealed minor changes in Ti oxidation states where all the Ti species are shifted to slightly higher binding energy side by approximately 0.5 eV with Ti center existing in 4+, 3+ and 2+ oxidation state likewise. This is expected as addition of MMAO12 can lead to reduction of titanium precursor. However, after addition of MMAO12 at [Al]/[Ti] ratio=600, the Ti$^{4+}$ and Ti$^{2+}$ peak intensities decreased drastically and only fit by one type of Ti species i.e. Ti$^3$+ [BE=457.7 eV]. Thus, the catalyst with [Al]/[Ti] ratio=600 gives a strong indication to be a pseudo single-site catalyst with Ti$^{3+}$ as the only detectable oxidation state. The oxidation state distribution on the surface of the Ti-catalyst is obtained from Ti 2p XPS peaks of the titanium species before (addition of MMAO12) and after addition of MMAO12 with [Al]/[Ti] ratio 20 and 600 respectively. The Ti 2p XPS peaks for these samples are shown in FIG. 13 and a quantitative distribution of Ti valence states is listed in Table 1.

TABLE 1

XPS data of the catalyst 1 at Ti 2p$_{3/2}$ level.

| No. | | Ti2p$_{3/2}$ | Peak BE (eV) | Atomic % |
|---|---|---|---|---|
| 1 | Before addition of MMAO12 | Ti$^{4+}$ | 459.7 | 25.7 |
|   |   | Ti$^{3+}$ | 457.2 | 56.8 |
|   |   | Ti$^{2+}$ | 454.4 | 17.5 |
| 2 | MMAO12 [Al/Ti] = 20 | Ti$^{4+}$ | 460.2 | 22.2 |
|   |   | Ti$^{3+}$ | 457.7 | 70.8 |
|   |   | Ti$^{2+}$ | 454.8 | 7 |
| 3 | MMAO12 [Al/Ti] = 600 | Ti$^{4+}$ | — | — |
|   |   | Ti$^{3+}$ | 457.7 | >99 |
|   |   | Ti$^{2+}$ | — | — |

As evident from table 1, treatment of catalyst 1 with [Al]/[Ti] ratio of 600 led to quantitative reduction of Ti(IV) to Ti(III). A characteristic Ti2p$_{3/2}$ peak for Ti$^{+3}$ is observed at a binding energy of 457.7 eV, which is in line with the reported value. After having established access to a supported catalyst with predominant Ti$^{+3}$ state, performance of 1 is evaluated in ethylene polymerization. Catalyst 1 after second activation with MMAO12 is observed to be highly active in ethylene polymerization and produced very high molecular weight polyethylene. The effect of MMAO12 on molecular weight, molecular weight distribution and activity is investigated and a [Al]/[Ti] ratio of 600 produced the optimal balance between M$_w$, MWD and productivity. Thus, at [Al]/[Ti]=600, PE with a weight average molecular weight of 2.07×10$^6$ g/mol. and an activity of 671 kg$_{PE}$/mol.Ti/h/atm is obtained. The highest M$_w$ with minimum activity is observed at 0° C., whereas minimum M$_w$ and maximum activity is evidenced at an elevated temperature of 60° C. Remarkably, catalyst 1 displayed a living behaviour over the period of 2 hours and a maximum M$_w$ of 13.07×10$^6$ g/mol. with narrow MWD is attained.

The thermal properties of the resultant dis-UHMWPE are observed using DSC. In the 1$^{st}$ heating cycle, the nascent polyethylenes revealed thermal transition at around 141-144° C., which is a characteristic melting transition for a disentangled UHMWPE. The DSC investigations demonstrated that the entangled state (melting at around 134° C.) and dis-entangled states (melting at around 140° C.) co-exist in the 2$^{nd}$ heating cycle. Similar observations are reported by Rastogi et al (*Macromol.Rapid Commun.* 2015, 36, 327-331) under identical thermal program. Thus, from the DSC investigations it is apparent that the nascent polymer obtained is in disentangled state. The disentangled state of the PE, molecular weight and molecular weight distribution is further corroborated by rheological investigations. Isothermal time sweep experiments showed that the elastic modulus increased with time reaching plateau values after about 48 hours. This corroborates the DSC evidence of disentangled nature of the as-synthesized PE.

The polymerization reactions are carried out in Büchi high pressure reactor in presence of MMAO12 as a second stage activator and the important polymerization results are summarized in Table 2. The most influential polymerization parameters, such as metal to MMAO12 ratio, temperature, ethylene pressure, and time are screened to obtain maximum molecular weight and narrow molecular weight distribution. After polymerization, the polymer molar mass (M$_w$ and M$_n$) and molar mass distribution (MWD) is determined using high temperature gel permeation chromatography (HT-GPC) at 160° C. in 1,2,4-trichlorobenzene. The absence of methyl branches suggests existence of highly linear polyethylene. As it is evident from table 2, polymerization could not take place in the absence of modified methylaluminoxane (MMAO12) or catalyst 1 (Table 2, run1-2). In homogeneous metallocene or postmetallocene catalyzed polymerization of olefins, methylaluminoxane (MAO) or modified MAO (MMAO12) is commonly used in large (Al:M=1000-20000) excess. Therefore, the effect of [Al]/[Ti] ratio on the activity and molecular weight of polyethylene is evaluated first. Initial polymerization with [Al]/[Ti] ratio of 10 or 20 are largely unsuccessful (Table 2, run 3). However, at a [Al]/[Ti] ratio of 100, few milligrams of polyethylene is obtained. It is observed that the activity increases with increasing [Al]/[Ti] ratio from 100 to 600 (Table 2, run 4-6) (activity=671 kg$_{PE}$/molTi/h/atm). However, there is a drop in activity to 642 kg$_{PE}$/mol Ti/h/atm when the [Al]/[Ti] ratio is further increased to 800 or 1000 (Table 2, run7-8). Similar trend is observed for weight average molecular weight (M$_w$), and the highest M$_w$ of 2.07×10$^6$ g/mol is observed at [Al]/[Ti] ratio of 600. The decrease in M$_w$ upon increasing MMAO12 above the limit of 600 can be explained by chain transfer to trimethyl aluminium (TMA). The trimethyl aluminium is usually present in MMAO12 and with increasing concentration of MMAO12, the amount of TMA increases leading to increase in chain transfer and subsequent reduction in molecular weight.

The polymerization reactions are performed between 0 to 60° C. at the [Al]/[Ti] ratio 600 atambient ethylene pressure in toluene for 10 minutes. The highest M$_w$ of 3.3×10$^6$ g/mol (Table 2, run 9) is observed at 0° C., while increasing the temperature to 60° C. led to reduced molecular weight of 1.35×10$^6$ g/mol (Table 2, run 11). The low molecular weight at high temperature could be due to enhanced β-hydride elimination or chain transfer reactions at 60° C. Although the highest molecular weight is observed at 0° C., but the activity observed is the lowest (Table 2, run 9) under these conditions. The optimal balance between activity, molecular weight and temperature is stricken at 40° C. (Table 2, run 6).

Figure 14:
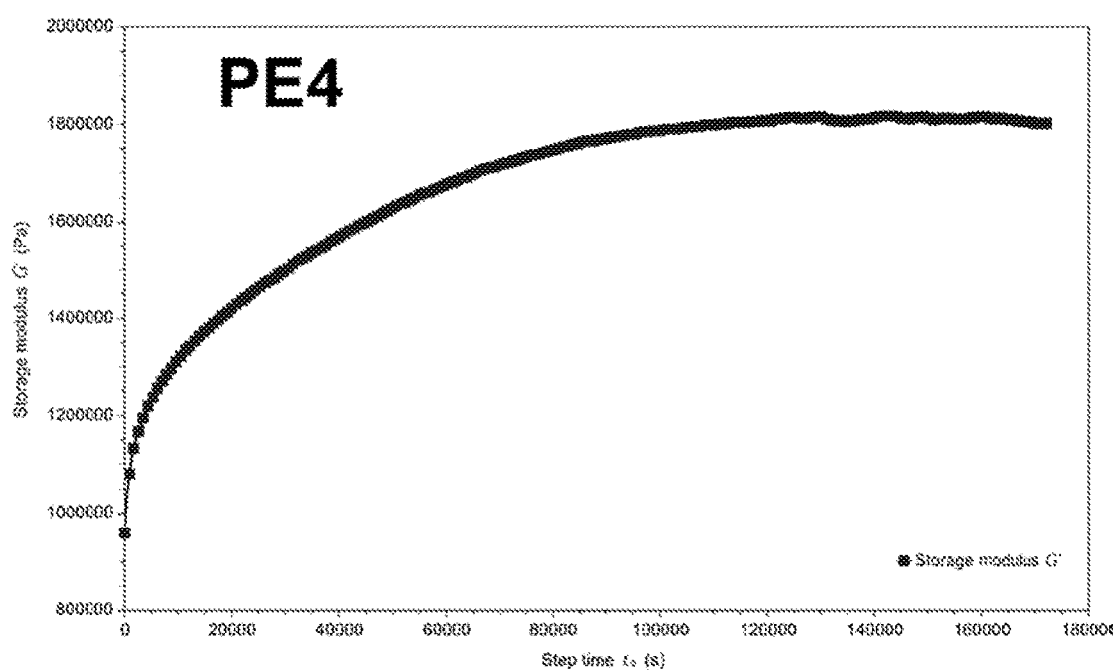
FIG. 14: Time sweep data of PE4 sample for about 48 hours. The equilibrium storage modulus is attained after about 37 hours. The G' value increases from 0.96 MPa to 1.82 MPa over the course of that time.

The above two parameters, [Al]/[Ti] and temperature are kept constant and effect of time on polymer molecular weight and catalytic activity is investigated. As it is apparent from runs 6 and 12-15 (Table 2) and FIG. 14, the molecular weight linearly increases with increasing time. The effect of time is investigated from 10 minutes to 120 minutes and the results indicate that the catalyst displays living behaviour, as the molecular weight keeps increasing with time. After 120 minutes, the molecular weight builds up to a whopping 13 million (13.07×10$^6$) g/mol with narrow molecular weight distribution (PDI=1.84-2.17). These observations indicate pseudo single site nature and living behaviour of the catalytic system. Next, the effect of ethylene pressure is investigated and the polymerization reactions are conducted at 1, 2 and 5 bar of ethylene pressure under identical conditions ([Al]/[Ti]=600; 40° C.; Toluene=150 mL, Time=10 mins.). As expected, molecular weight increases with increasing ethylene pressure and a maximum $M_w$ of 3.91×10$^6$ g/molis obtained at 5 bar ethylene pressure (Table 2, run-17).

The melting and crystallization temperature is obtained from differential scanning calorimetry data. The first melting peak ($T_{m1}$) obtained from the 1$^{st}$ heating cycle is in the range of 141.3-144.1° C. for the polyethylenes prepared in this investigation, whereas the second melting peak ($T_{m2}$), obtained from the 2$^{nd}$ heating cycle varied between 134.6-135.7° C. Thus, in general, second melting peaks are approximately 7 to 8° C. lower than the first melting peaks. This behavior is indicative of disentangled state of UHMWPE. The first melting peak of the nascent PE is attributed to formation of single crystal lamellae, which is a hallmark of the disentangled state, whereas the peak after second melting indicates the hindrance to formation of single crystal lamellae due to presence of entanglements formed after 1$^{st}$ heating. Degree of crystallinity of majority of the nascent PE samples is above 60%, as analysed from enthalpy of the 1$^{st}$ melting peak relative to the theoretical melting enthalpy of 293 J/g for 100% crystalline PE. The maximum crystallinity of 82% and 84% is obtained for a polymerization run at 0° C. for 10 minutes and 1 hour (Table 1 run-9 & 18) respectively.

Figure 15:
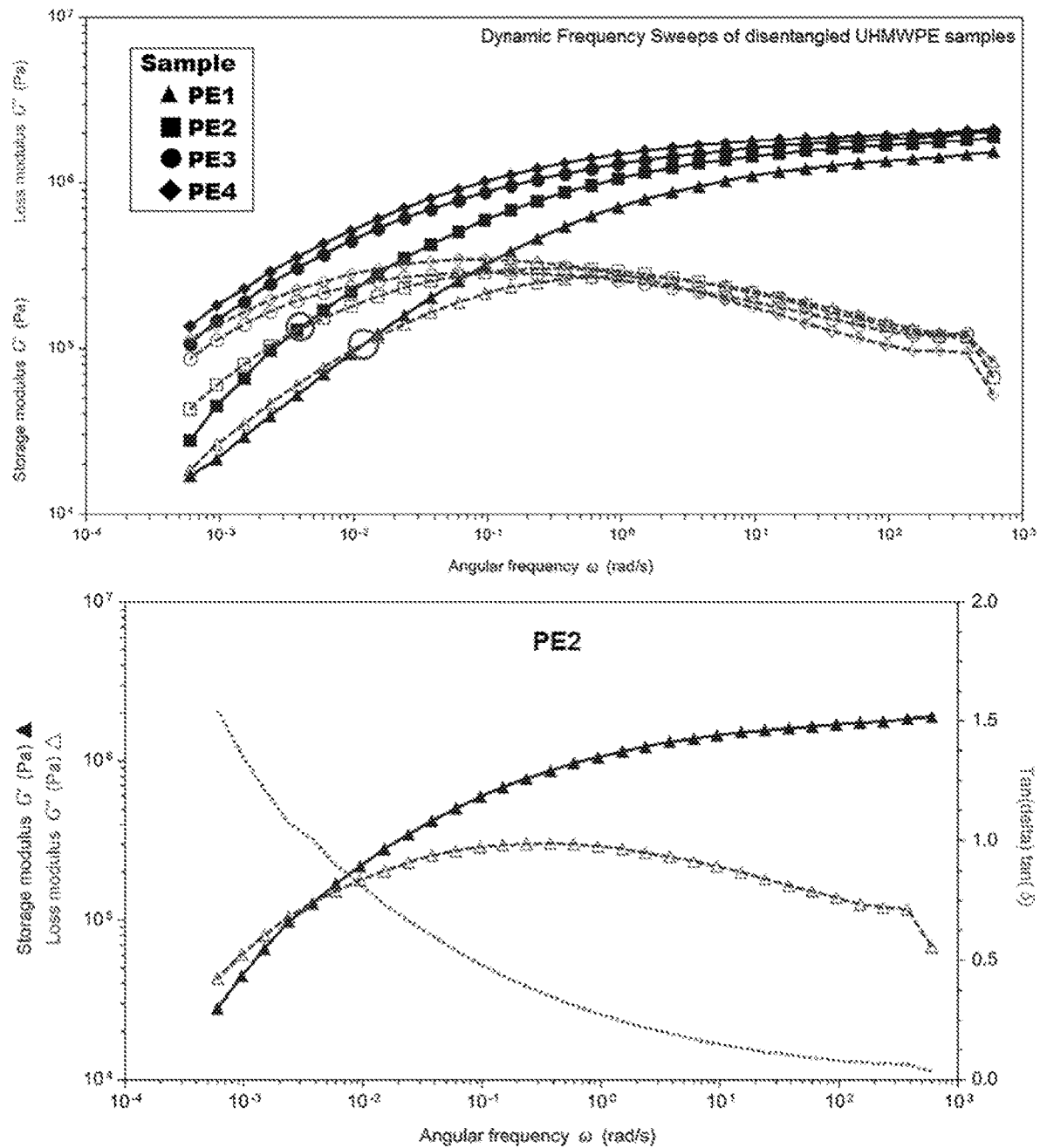
FIG. 15: Dynamic frequency sweep of the PE samples after the equilibration in the time sweep. G' and G" are represented by solid lines and dashed lines respectively (top). The modulus crossovers of PE1 and PE2 are indicated by red circles. The data for PE2 is shown separately at the bottom for clarity.

To further investigate the disentangled state of the polyethylene obtained using catalyst 1, DSC experiments are performed using a thermal analysis protocol developed by Rastogi et al. (*Macromolecules* 2016, 49, 7497-7509). At a time when the semicrystalline polymer is molten, the disentangled polymer chains in the noncrystalline phase tend to entangle leading to heterogeneous distribution of entanglement density in melt. The presence of dis-entangled PE is confirmed by the appearance of two separate melting peaks in DSC curve, after annealing and isothermal crystallization for stipulated time. A lower temperature melting peak at 134° C. and a higher temperature melting peak at 139.5° C. indicates the crystallization from entangled and disentangled domains of the heterogeneous polymer melt, respectively. Furthermore, it is observed that the ratio of area under the low and high melting temperature peaks changes with the annealing time (at 160° C.).Thus, the ratio of area under higher temperature melting peak decreases and eventually the area under lower temperature melting peak (entanglement density) increases with increasing annealing time from 5 to 60 minutes. This phenomenon is in line with the previous report and is associated with the transformation of the heterogeneous distribution of entanglement density to homogeneous state (FIG. 15).

The FIG. 16 shows results of isothermal time sweep oscillatory test for a representative sample run 18 from Table 2. The storage modulus is seen to increase with time and eventually saturates after about 48 hours. The rise in G' is rapid initially followed by more gradual increase till saturation. These trends are indications of the disentangled state of the sample, in agreement with the DSC results. The disentangled state is intrinsically metastable and has lower elasticity. During isothermal annealing, the chains reorganize to achieve the equilibrium entangled state, which has higher elasticity. Hence G' increases as seen in FIG. 16. All samples showed similar time sweep behavior indicating that they are synthesized in disentangled states. Small amplitude frequency sweep measurements are then performed on four samples, viz. runs 7, 6, 13 and 18 from Table 2, which are labelled PE1, PE2, PE3 and PE4 respectively at 190° C. According to HT-GPC, the molecular weights of these UHMWPE samples are ordered as PE1<PE2<PE3<PE4.

The Frequency sweeps are performed only after the equilibrium entangled state of the samples is attained i.e. after approximately 48 hours in a time sweep at 190° C. The storage moduli (G') and viscous moduli (G") of the samples are plotted in FIG. 17 (top). Additionally, the G', G" and tan delta of the sample PE2 are displayed separately in FIG. 17 (bottom). The storage moduli increase with increase in molecular weight. For the lower molecular weight samples, crossovers of the storage (G') and viscous (G") moduli curves are seen at (0.01 rad/s, 0.105 MPa) for PE1, and at (4×10$^{-3}$ rad/s, 0.131 MPa) for PE2. No crossovers are seen in PE3 and PE4 due to the high molecular weights of the samples. As shown in FIG. 17 (bottom) for PE2, the G' shows weak but finite frequency dependence after crossover frequency and the G" data shows a peak at frequencies higher than the crossover frequency. The entanglement molecular weight $M_e$ is taken to be 1250 g/mol, which is a reasonable assumption for UHMWPE at 190° C.

EXAMPLES

Following examples are given by way of illustration and therefore should not be construed to limit the scope of the invention.

Example 1: Synthesis of Catalyst a) Synthesis of Catalyst Where M is Zirconium (Catalyst 2)

In a two necked reactor equipped with a magnetic bar nitrogen inlet and outlet addition funnel, 100 ml of dry n-hexane was added followed by 1.15 g (4.24 mmol) zirconium(IV) ethoxide and 6.2 g (65 mmol) of anhydrous magnesium chloride. The mixture was stirred at 80° C. for one hour. The temperature was brought to 40° C. and 6.2 g (6.5 ml) of diethyl aluminium chloride in 20 ml of n-hexane was added dropwise in half an hour. The temperature was raised to 80° C. and maintained for two hours. The obtained greenish black slurry was cooled to 30° C. and washed with dry n-hexane for three times. Finally the solid catalyst was dried under vacuum and stored in glove box for further use. The solid catalyst was characterized using solid-state NMR and elemental analyses were done using ICP. The catalyst component contained following percentage by weight: Zr 5.37%; Al 0.77%; Mg 16.99%.

b) Synthesis of Catalyst Where M is Titanium (Catalyst 1)

In a two necked reactor equipped with a magnetic bar nitrogen inlet and outlet, addition funnel, 100 ml of dry n-hexane was added followed by 1 g (4.4 mmol) titanium (IV) ethoxide and 6.1 g (64 mmol) of anhydrous magnesium chloride. The mixture was stirred at 80° C. for one hour. The temperature was brought to 40° C. and 6.34 g (6.6 ml) of diethyl aluminium chloride in 20 ml of n-hexane was added dropwise in half an hour. The temperature was raised to 80° C. and maintained for two hours. The obtained brownish black slurry was cooled to 30° C. and washed with dry n-hexane for three times. Finally the solid catalyst was dried under vacuum and stored in glove box for further use. The solid catalyst was characterized using solid-state NMR and elemental analyses were done using ICP. The catalyst component contained following percentage by weight: Ti 3.02%; Al 1.12%; Mg 17.83%.

$^1$H CP-MAS NMR (400 MHz, 298 K): δ=3.88 (broad, s, CH$_2$), 0.77 (broad, s, CH$_3$); $^{13}$C CP-MAS NMR (100 MHz, 298 K): δ=76.1-71.1 (m, OCH$_2$, Ti(OEt)$_4$), 32.3 (m, CH$_2$, n-hexane), 25.7 (m, CH$_2$, n-hexane), 17.8 (m, CH$_3$, Ti(OEt)$_4$), 8.2 (m, CH$_2$, DEAC), 1.6 (s, CH$_3$, DEAC).

Example 2: Ethylene Polymerization

A dried Buchi reactor equipped with a magnetic stirred bar, thermometer probe was heated at 80° C. temperature under vacuum for 1 hour. Under this temperature the reactor was pressurised with argon gas for 40 minutes. Dried toluene is introduced to the reactor, followed by addition of 10% MAO out of required amount and argon is bubbled through the solvent for 40 minutes under stirring. The argon is then replaced by ethylene gas, which is left bubbling through the solvent. After 30 min, the 70% amount of MAO is introduced, and the reaction flask is then placed at the desired temperature. When the requisite temperature is reached, the polymerization is initiated by addition of the catalyst of example 1(desired amount of Ti or Zr catalyst) previously suspended in dry toluene and activated by remaining 10% of MAO solution. The polymerization was carried out at 40° C. for 1 hour by gently stirring the reaction. The polymerization is quenched by addition of an acidified methanol. The resulting polyethylene is filtered, washed with methanol/acetone, and dried overnight under vacuum at 40° C.

As the catalyst is air/moisture sensitive, a specially designed vacuum transfer module was used to transfer samples from a glove box environment into the K-Alpha$^+$ system without exposure to air.

b) NMR Measurements

All solid state NMR spectra were recorded on a Joe1400 spectrometer, resonating at 100 MHz for $^{13}$C and 400 MHz for $^1$H, using a 4 mm double resonance MAS probe. High temperature NMR of the UHMWPE sample was recorded at 130° C. in C$_6$D$_6$+TCB (10:90) on a 500 MHz machine (Bruker Avance).

c) Determination of Molar Mass (M$_w$) and Molar Mass Distribution (PDI)

Weight-average molecular weight (M$_w$), number average molecular weight (M$_n$) and polydispersityindex (PDI) of the synthesized disentangled UHMWPEs was recorded in 1,2,4-trichlorobenzene at 160° C. by a Viscotek GPC (HT-GPC module 350A) instrument equipped with the triple detector system. The detectors were calibrated with linear polystyrene standards and the reported molecular weight s are absolute molecular weights.

d) Scanning Electron Micrographs

The morphology of the catalyst 1 was investigated using a high-resolution FEI QUANTA 200 3D Environmental SEM. The sample was suspended in hexane and placed on silicon wafer. The samples were coated with gold by a sputtering technique.

e) Thermal Analysis

A TA instrument Q-10 or Q-100 Differential Scanning calorimeter (DSC) was utilized to obtain the melting tem-

TABLE 2

Polymerization of ethylene catalyzed by supported Ti-catalyst (1) in presence of MMAO12.[a]

| Run | Al/Ti | Time (min.) | Temp. (° C.) | Yield (g)[b] | Activity kg$_{PE}$/mol Ti/h/atm[c] | Mw (10$^6$ g/mol)[d] | PDI[d] | Tm (° C.)[e] | Cryst. (%)[f] |
|---|---|---|---|---|---|---|---|---|---|
| 1 | Without MMAO12 | 10 | 40 | No polymer | — | — | — | — | — |
| 2 | Without 1 | 10 | 40 | No polymer | — | — | — | — | — |
| 3 | 20 | 10 | 40 | No polymer | — | — | — | — | — |
| 4 | 100 | 10 | 40 | 0.05 | 24 | 1.08 | 1.93 | — | — |
| 5 | 400 | 10 | 40 | 0.83 | 398 | 1.23 | 1.86 | 142.8 | 54.5 |
| 6 | 600 | 10 | 40 | 1.4 | 671 | 2.07 | 1.84 | 142.2, | 67.44 |
| 7 | 800 | 10 | 40 | 1.35 | 647 | 1.01 | 2.00 | 142.1 | 66.1 |
| 8 | 1000 | 10 | 40 | 1.34 | 642 | 1.09 | 2.25 | 142.1 | 65.1 |
| 9 | 600 | 10 | 0 | 0.20 | 96 | 3.29 | 1.73 | 142.5 | 82.4 |
| 10 | 600 | 10 | 20 | 0.48 | 230 | 2.11 | 1.75 | 142.3 | 72.3 |
| 11 | 600 | 10 | 60 | 3.21 | 1538 | 1.35 | 2.10 | 141.3 | 70.2 |
| 12 | 600 | 30 | 40 | 3.75 | 600 | 3.05 | 1.83 | 142.6 | 70 |
| 13 | 600 | 60 | 40 | 5.5 | 440 | 7.03 | 1.87 | 143.0 | 46.1 |
| 14 | 600 | 90 | 40 | 5.2 | 277 | 10.89 | 2.04 | 142.8 | 64.6 |
| 15 | 600 | 120 | 40 | 5.32 | 213 | 13.07 | 2.17 | 144.1 | 69.7 |
| 16[g] | 600 | 10 | 40 | 1.56 | 374 | 3.32 | 2.24 | 142.4 | 75.7 |
| 17[h] | 600 | 10 | 40 | 1.60 | 153 | 3.91 | 2.25 | 142.6 | 68.1 |
| 18 | 600 | 60 | 0 | 0.47 | 38 | 9.48 | 1.89 | 142.9 | 84 |

[a]Conditions: Catalyst = 12.5 μmol of Ti (20 mg of catalyst 1); Solvent = 150 mL of toluene;
[b]Obtained from gram of polyethylene isolated;
[c] Activity = kg of PE/[mol of Ti]/atm/hour];
[d] As obtained from HT-GPC at 160° C. in 1,2,4-Trichlorobenzene (TCB) against polystyrene standards, in 10$^6$ g/mol.;
[e] Obtained from DSC, first heating cycle;
[f] Crystallinity calculated from the melting enthalpy measured by DSC and relative to the theoretical value for 100% crystalline polyethylene,
[g]2 bar ethylene puressure;
[h]5 bar ethylene pressure.

Example 3: Characterization of Catalysts and Nascent Polyethylene (Disentangled UHMWPE)

a) XPS Analysis

Figure 8:
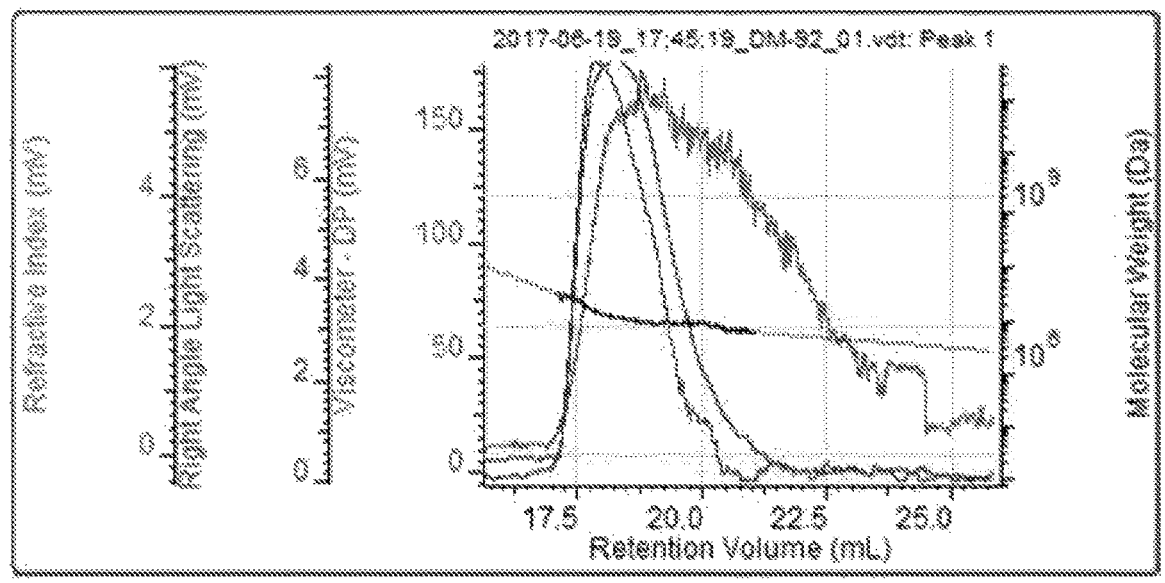
FIG. 8: HT-GPC curve for entry 5.
Figure 9:
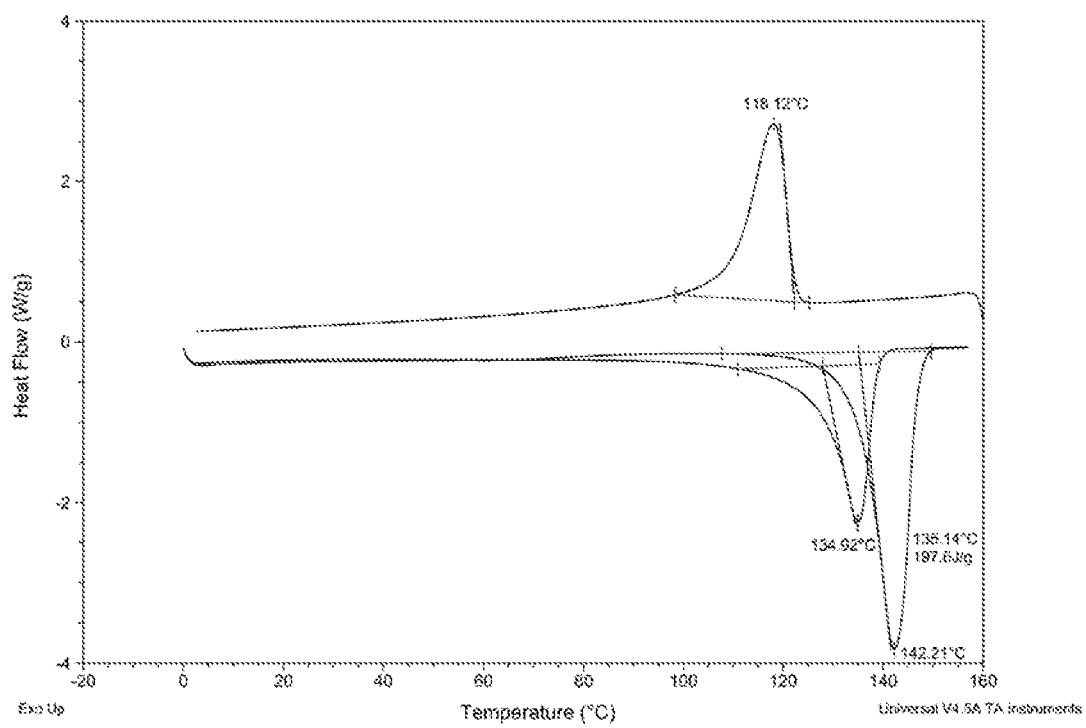
FIG. 9: Differential Scanning calorimetry (DSC) heating and cooling curves of first heating, cooling and second heating (Entry No. 6).
Figure 10:
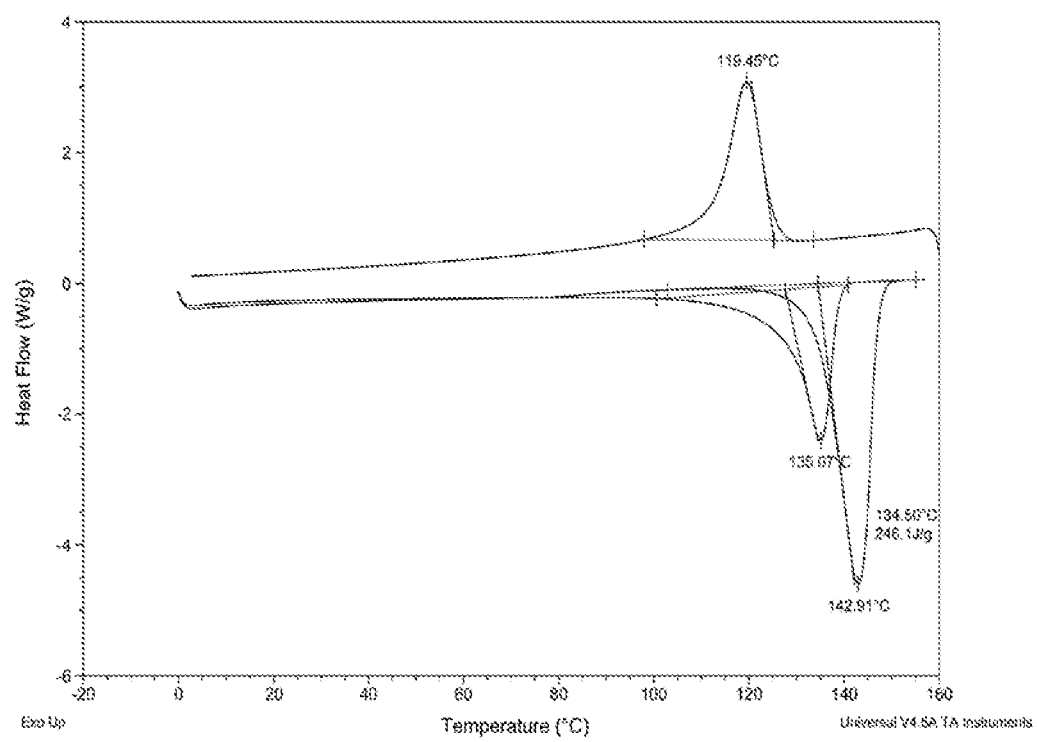
FIG. 10: DSC heating and cooling curves of first heating, cooling and second heating (Entry No. 18).
Figure 11A:
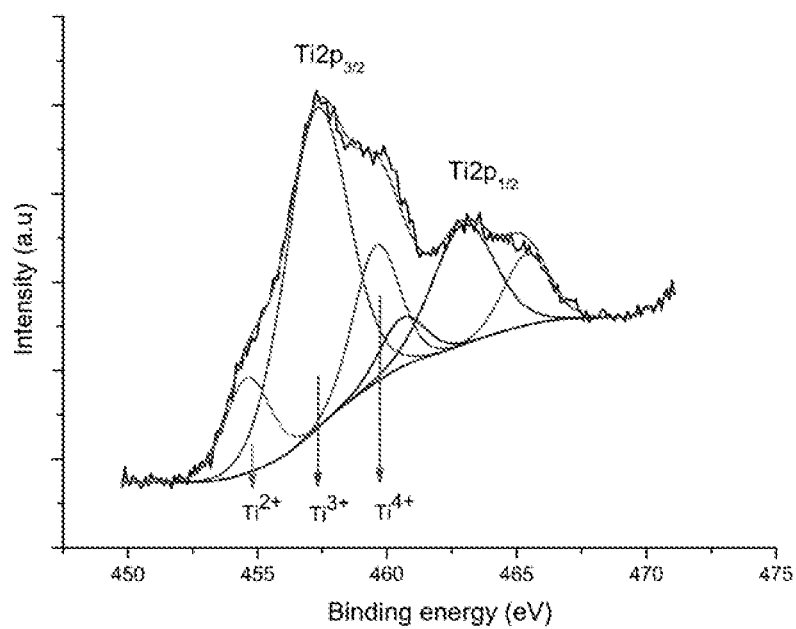
FIG. 11: Ti 2p XPS spectra of; catalyst 1 before addition of MMAO12 (a); after addition of MMAO12 [Al]/[Ti]=20 (b) and after addition of MMAO12 [Al]/[Ti]=600 (c).
Figure 11B:
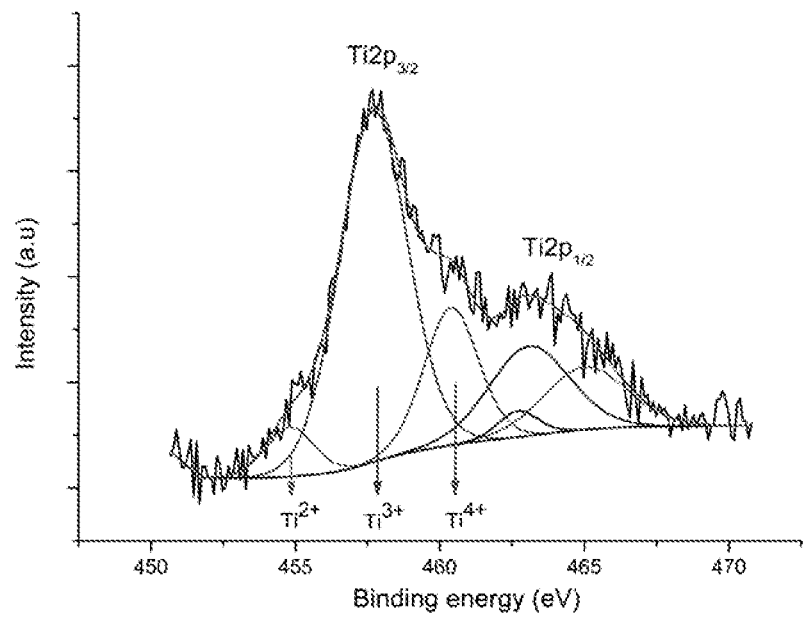
Figure 11C:
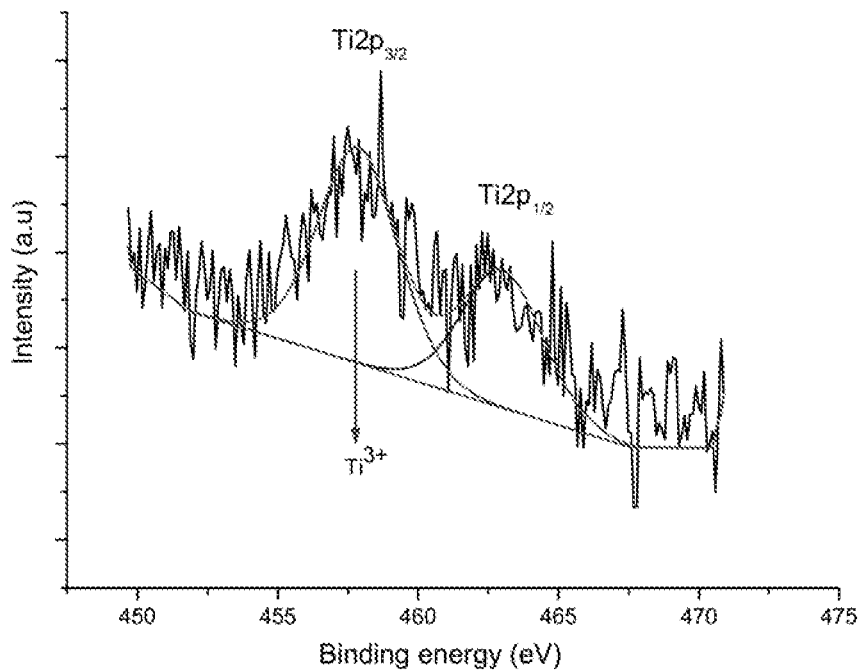
Figure 12:
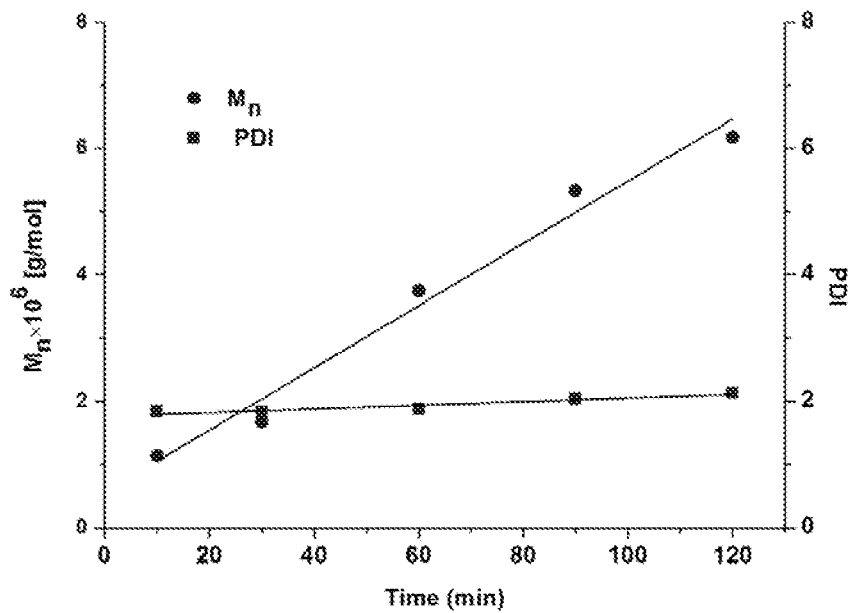
FIG. 12: Plots of $M_n$ and $M_w/M_n$ (PDI) as a function of polymerization time for ethylene polymerization at [Al]/[Ti] ratio 600, 1 bar of ethylene pressure and 40° C. in toluene.

XPS measurements were carried out using Thermo Scientific K-alpha+ X-ray Photoelectron Spectrometer (XPS).

peratures (T$_m$) and subsequent melt enthalpies. To minimize the thermal lag caused by the samples, the weight is kept within 6 mg±0.1 mg for each sample. During the measurement, nitrogen was continuously purged at 50 mL/min. A thermal protocol has been devised to obtain samples having different entanglement densities by following a literature reported method as depicted in FIG. 8. The sample was heated from 50° C. to an annealing temperature which is higher than PE's equilibrium temperature (145° C.) at 10° C./min. to 160° C. At this temperature, the sample was annealed for a fixed time (5, 15, 30 and 60 min.). Four different annealing times were chosen to vary entanglement density in melt. Next, the sample was cooled to an isothermal crystallization temperature of 128° C., at 10° C./min. rate. The sample was kept on hold at isothermal crystallization temperature for a fixed time of 180 min. Next, the sample was cooled to 50° C. and second heating was done from 50 to 160° C. at 10° C./min. The DSC plots shown in FIG. 15 were obtained during this second heating ramp.

f) Rheology Measurements

The melt properties of the polyethylene were measured using 8-mm aluminium parallel plate geometry on a strain controlled rheometer (ARES G2). The PE samples (along with 0.7 wt. % antioxidant Irganox 1010) was compacted into an 8-mm diameter disc of 1 mm thickness at room temperature using a hand-held mold. The disc was loaded into the rheometer at 110° C. The temperature was increased to 130° C. at a heating rate of 30° C./min while a constant axial force of 1 N was applied on the sample. The temperature was then ramped up to 190° C. at a rate of 10° C./min while the axial force was stepped up to 4 N. This method of heating and application of axial load is adapted from literature, and is done to avoid slippage and ensure adequate contact between the sample and the rheometer plate. Once the temperature of the sample reached 190° C., a time sweep was performed at a frequency of 10 rad/s with a strain of 0.5% for about 48 hours after which a dynamic frequency sweep was performed on the sample at 190° C. The frequencies tested were from 400 rad/s to $6\times10^{-4}$ rad/s at a strain of 0.5%.

Advantages of Invention

1. Metal-alkoxide based catalysts have been first time used in the preparation of disentangled ultrahigh molecular weight polyethylene.

2. The Disentangled ultra-high molecular weight polyethylene (dis-UHMWPE) prepared by using the catalyst of present invention is known to imbibe improved physical and mechanical properties such as chemical inertness, lubricity, impact resistance, and abrasion resistance.

3. The (dis-)UHMWPE prepared may find various applications such as bullet proof jackets, helmets, medical prosthetics and high strength light weighted strong fibers and tapes.

The invention claimed is:

1. A heterogeneous precatalyst and a co-catalyst comprising:
(a) a compound of formula $M(OR)_4$;
(b) a compound of formula $AlR'_nCl_{3-n}$ and;
(c) a support (M'-X)
wherein:
transition metal (M) is selected from a group consisting of Titanium (Ti) and Zirconium (Zr);
Al=Aluminium;
R is selected from a group consisting of methyl, ethyl, iso-propyl, phenyl, p-methylphenyl, p-methoxyphenyl, 2,4,6 bromophenyl, and 2,4,6 triethoxyphenyl group;
R' is selected from a group consisting of methyl, ethyl, isopropyl, and tert butyl;
n=1 to 3;

the support (M'-X) is selected from a group consisting of magnesium chloride, calcium chloride, and barium chloride; and
the co-catalyst is selected from a group consisting of methylaluminoxane (MAO), modified methylaluminoxane (MMAO12), and ethylaluminoxane.

2. The heterogeneous precatalyst as claimed in claim 1, wherein the mole ratio of M'/M is in the range of 10 to 20.

3. The heterogeneous precatalyst as claimed in claim 1, wherein the mole ratio of M'/M is in the range of 15 to 16.

4. The heterogeneous precatalyst as claimed in claim 1, wherein the mole ratio of Al/M is in the range of 8 to 16.

5. The heterogeneous precatalyst as claimed in claim 1, wherein the mole ratio of Al/M is in the range of 12 to 13.

6. The heterogeneous precatalyst as claimed in claim 1, wherein said catalyst comprises M in the range of 2.5 to 6 weight %, M' is in the range of 10 to 17 weight % and Al in the range of 0.8 to 1.1 weight %.

7. A process for the preparation of heterogeneous precatalyst comprising the steps of:
a) reacting compound of general formula $M(OR)_4$ with a support (M'-X), a metal halide in a solvent at temperature in the range of 60° C. to 100° C. for the period in the range of 1 to 4 hrs to form a slurry;
b) activating the slurry as obtained in step (a) by treating with compound of formula $AlR'_nCl_{3-n}$ in a solvent at a temperature in the range of 40 to 50° C. under constant stirring followed by further stirring reaction mixture at temperature in the range of 60 to 100° C. for the period in the range of 2 to 8 hrs to afford the heterogeneous precatalyst.

8. The process as claimed in claim 7, wherein said support (M'-X) is selected from a group consisting of magnesium chloride, calcium chloride, and barium chloride.

9. The process as claimed in claim 7, wherein the compound of formula $AlR'_nCl$ 3-n is selected from a group consisting of triethyl aliuminium, trimethyl aluminium, diethyl aluminium chloride, ethyl aluminium chloride, aluminium chloride, tri-isopropyl aliuminium, diisopropyl aluminium chloride, tri-tertbutyl aluminium, and di-tertbutyl aluminium chloride.

10. The process as claimed in claim 7, wherein the solvent used is a hydrocarbons selected from a group consisting of n-pentane, n-hexane, n-heptane, n-octane, toluene, and xylene.

11. A process for synthesis of disentangled ultra-high molecular weight polyethylene using a heterogeneous precatalyst, the process comprising the step of:
polymerizing an ethylene monomer in presence of the heterogeneous precatalyst and a co-catalyst at temperature in the range of 0 to 60° C. for the period in the range 10 min to 10 hrs to afford the disentangled ultra-high molecular weight polyethylene,
wherein:
the heterogeneous pre-catalyst comprises: (a) a compound of formula $M(OR)_4$; (b) a compound of formula $AlR'_nCl_{3-n}$ and (c) a support (M'-X);
transition metal (M) is selected from a group consisting of Titanium (Ti) and Zirconium (Zr), Hafnium (Hf), Vanadium (V), Niobium (Nb), and Tantalum (Ta);
Al=Aluminium;
R is selected from a group consisting of methyl, ethyl, iso-propyl, phenyl, p-methylphenyl, p-methoxyphenyl, 2,4,6 bromophenyl, and 2,4,6 triethoxyphenyl group;
R' is selected from a group consisting of methyl, ethyl, isopropyl, and tert butyl;

n=1 to 3; and the support (M'-X) is selected from a group consisting of magnesium chloride, calcium chloride, and barium chloride.

12. The process as claimed in claim 11, wherein said solvent is a saturated or an unsaturated hydrocarbon.

13. The process as claimed in claim 11, wherein said solvent is toluene.

14. The process as claimed in claim 11, wherein said co-catalyst is selected from a group consisting of methylaluminoxane (MAO), modified methylaluminoxane (MMAO12), and ethylaluminoxane.

15. The process as claimed in claim 11, wherein said reaction is carried out under argon atmosphere.

16. The process as claimed in claim 11, wherein a mole ratio of co-catalyst to M in the precatalyst is 100 to 1000.

17. The process as claimed in claim 11, wherein a mole ratio of co-catalyst to M in the precatalyst is 600.

18. The process as claimed in claim 11, wherein a molecular weight of ultra-high molecular weight polyethylene (UHMWPE) is in the range of $1\times10^6$ to $4\times10^7$ grams/mole.

19. The process as claimed in claim 11, wherein said reaction is carried out in a continuous mode or a batch mode.

20. The process as claimed in claim 12, wherein said unsaturated hydrocarbon is toluene.

\* \* \* \* \*